United States Patent Office 3,167,903
Patented Feb. 2, 1965

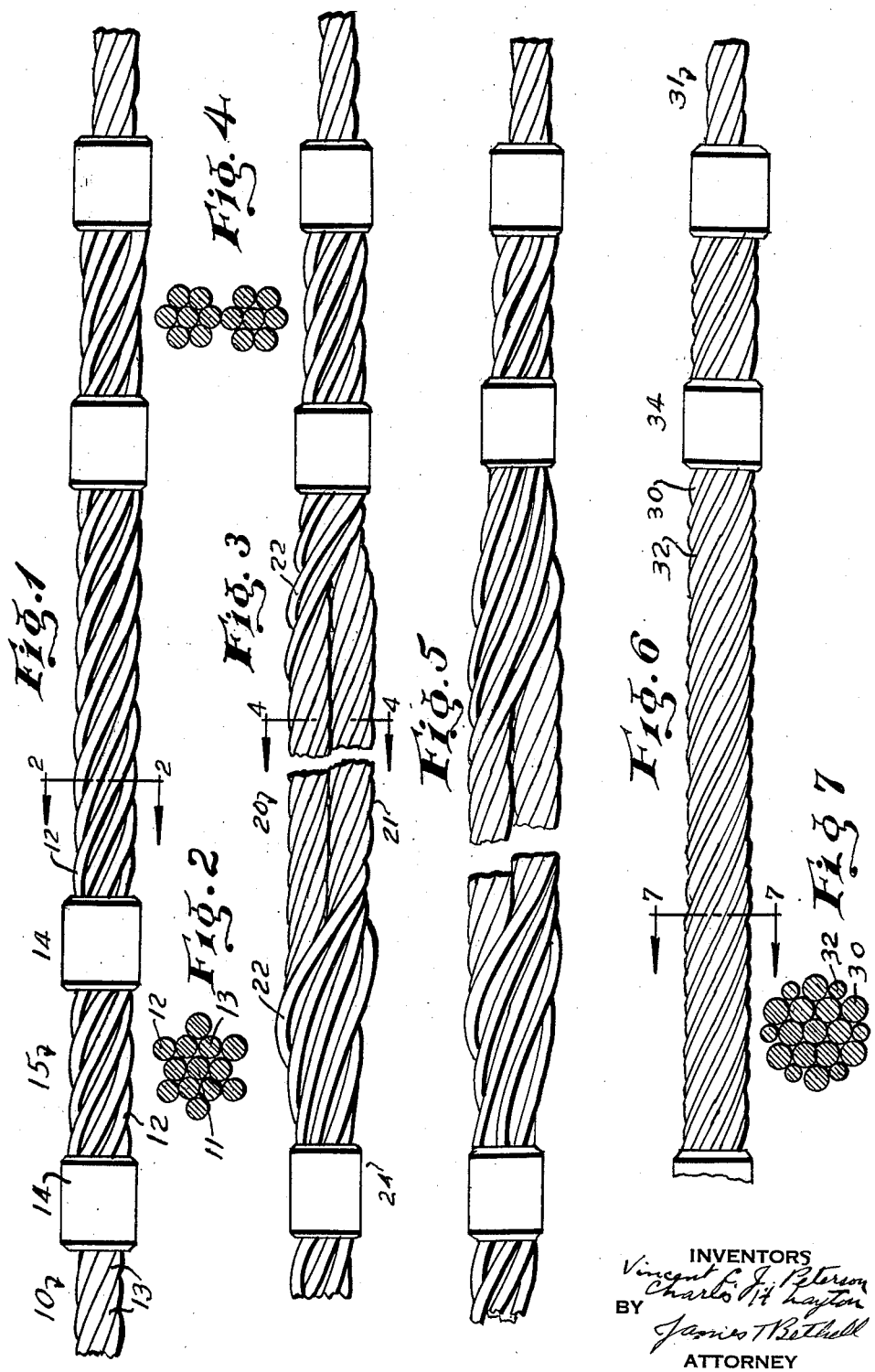

3,167,903
BRIDLES
Vincent C. J. Peterson, Huntingdon Valley, and Charles H. Layton, Forty Fort, Pa., assignors to American Chain & Cable Company, Inc.
Filed Aug. 28, 1961, Ser. No. 134,314
5 Claims. (Cl. 57—145)

This invention relates to slings or bridles, that is, short lengths of rope which have fittings at each end for attachment to an object and engage another object, such as a hook, intermediate such fittings for lifting or the like. It has particular application in connection with the launching of aircraft by catapult from aircraft carriers by virtue of the many limitations and requirements of this service.

Present day aircraft carrier operation requires that aircraft be launched in as rapid succession as possible. In addition, the planes have grown so heavy, and have such a high minimum flying speed (in the order of 200 knots), that the force required to accelerate them from a standstill to flying speed in the length of the catapult (two hundred feet or so) is very great. The bridle utilized in launching is supplied with a fitting at each end for engaging hooks on the underside of the aircraft, and the center of the bridle engages the travelling launching hook which travels along a track on the deck. The rapid succession of launches requires that the flight deck crew be able to manhandle the bridles into position and hook them in place readily. A bridle of wire rope of sufficient strength to safely transmit the accelerating force, if of usual construction, is extremely heavy, stiff and awkward to handle, and can be attached to the plane only with considerable difficulty.

Even if devices and techniques were devised to enable the ready attachment of such unwieldy bridles, there is another limitation on the size and weight of the bridle. An arresting bridle is provided in connection with the launching bridle, the function of which is to prevent the launching bridle from going over the bow after the release of the aircraft. If the launching bridle fittings are too heavy, upon arrest by the arresting bridle the fittings may bounce upon the deck high enough to strike the tail of the departing aircraft, disabling it. The weight of the launching bridle fittings, of course, depends upon the diameter of the wire rope of which the bridle is fabricated.

In other fields of use, as for instance, slings, reduction of weight and stiffness is desirable and sometimes necessary, although in general the problem is probably not as acute as it is if the case of launching bridles as above set forth.

From the above considerations, it can be seen that the primary object of the present invention is the production of a bridle of minimum size for a given strength. Other objects and advantages will become apparent as the description proceeds.

Experience has shown that when a rope of uniform diameter is tested in a manner to load it as it is loaded in a launching bridle, that is, by tensioning it by pulling the ends while its intermediate portion is positioned around a pin, rupture takes place at or near the region in contact with the pin. This is well known throughout the art, and is one reason for the specification of sheave diameters for proper utilization of wire rope. The reason is apparently that the load is not evenly divided among the strands and center because of the bending, and the most highly loaded strand parts first.

The present invention overcomes this effect by reinforcing the portion where the failure would occur, by adding strands or rope in that portion. It can be seen that if such strands or ropes can be made to take their share of the load (as distinguished from mere worming), the resultant structure should be capable of resisting rupture until a load is reached sufficient to part the rope in one leg or the other of the bridle.

Several methods have been devised in accordance with the above, which are set forth in connection with the drawings in which:

FIG. 1 is a showing of one form of the present invention;

FIG. 2 is a section on line 2—2 of FIG. 1, looking in the direction of the arrows;

FIG. 3 is a showing of a second form of the invention;

FIG. 4 is a section taken on line 4—4 of FIG. 3;

FIG. 5 is a third form of the invention, closely allied to that form shown in FIG. 3;

FIG. 6 is a further form of the present invention; and

FIG. 7 is a section taken on line 7—7 of FIG. 6.

In the construction shown in FIGS. 1 and 2, the number of strands forming the center or reinforced portion of the bridle is increased by the addition of strands around the periphery of the section to be reinforced. A rope 10, consisting of six strands of wire surrounding a core 11, also of wire, comprises the main body of the bridle. A short length of wire rope of the same diameter as the rope 10 is unstranded, and the strands 12 laid up around the rope 10. The laid on strands can readily be disposed in the valleys between adjacent strands 13 of the main rope. It might be mentioned that the rope from which the strands 12 are taken is preferably a preformed one, for ease of operation, although this is not absolutely necessary. Preformed rope strand retains its helical configuration, and lies naturally in the valleys of the body of rope upon which it is placed, and also does not have to be seized to prevent unstranding. There is no particular reason for using strand from already closed rope, except convenience, and the fact that no new techniques are required to produce it.

After the strands are laid in place, and if necessary, temporarily seized to hold them in position, four collars or ferrules are swaged over them. These collars 14 are swaged sufficiently to cause transfer of the load from the inner rope to the outer strands. The spaced strands and the spaced collars at each end act in a manner analogous to the collars in Peterson Patent 2,414,664, to which reference is hereby made. The space 15 between the collars at the end of the reinforced portion serves to increase the transfer of load from the central main rope to the reinforcing strands exactly as set forth in the reference.

The above described structure is a considerable improvement over a plain bridle. Tests have shown that a bridle tensioned around a pin of a diameter causing breakage of an unreinforced bridle at 60% to 70% of the catalogue strength, is, when reinforced in this manner able to resist tension up to 90% and sometimes more, of the catalogue breaking strength.

Because the ratio of pin diameter to rope diameter is a factor in the breaking point, the constructions shown in FIGS. 3, 4 and 5 were devised. In that shown in FIG. 3, a length of rope 20 is laid side by side with a short length 21 of the same rope. The ends of the short length of rope are unlaid, and the strands 22 resulting are laid around the body of the rope 20. The body of the rope 20 is bent, and the strands 22 so disposed that the whole assembly is symmetrical about the axis of the standing part of the rope 20 and ferrules 24 are attached as above described. This results in a reinforced section in effect two parallel ropes, which readily resists breaking, all breaks occurring in the legs of the bridle.

A variation of this structure, which is in results the equivalent, is shown in FIG. 5. Two lengths of rope are laid side by side, and the strands of their unlaid ends wrapped around the body of the next adjacent rope. Ferrules are attached exactly as set forth in connection with the showing in FIG. 3.

In FIG. 6 there is shown a variation of the structure of that in FIG. 1. Strands 30 are laid in the valleys of the main rope body 31, as described in connection with FIG. 1, these strands being of rope of the same size as the rope 31. A series of strands of smaller rope are then laid between the strands 30. As can be seen from FIG. 7, the diameter of strands 32 is such that the strands 30 and 32 have their outermost wires lying in the same circle. As a result, ferrules 34 engage all the outer strands and swaging results in the ferrules engaging all strands efficiently.

We claim:

1. A length of wire rope having a reinforced section, the reinforcement comprising a plurality of strands lying in the valleys of the rope body, and means securing the ends of the strands in the valleys of the rope body against longitudinal movement.

2. A length of wire rope having a reinforced section, the reinforcement comprising a plurality of strands lying in the valleys of the rope body, and a ring at each end of the reinforced section pressing the ends of the strands into the valleys of the rope body against longitudinal movement.

3. A length of wire rope having a reinforced section, the reinforcement comprising a plurality of strands lying in the valleys of the body of the rope, a ring at each end of the reinforced section pressing the ends of the strands into the body of the rope, and a pair of rings intermediate the first-mentioned rings spaced therefrom and from each other pressing the strands into the rope body against longitudinal movement.

4. A length of wire rope having a reinforced section, the reinforcement comprising a plurality of strands lying in the valleys of the body of the rope, a plurality of strands intermediate the first-mentioned strands lying on the body of the rope, and a ring at each end of the strands pressing them against the rope body.

5. A length of wire rope having a reinforced section, the reinforcement comprising a plurality of strands lying in the valleys of the rope body, a plurality of strands intermediate the first-mentioned strands lying on the body of the rope, the first- and second-mentioned strands each being of a diameter to be tangent to a common circle.

References Cited in the file of this patent

UNITED STATES PATENTS

| | | |
|---|---|---|
| 2,463,199 | Peterson | Mar. 1, 1949 |
| 2,587,521 | Peterson | Feb. 26, 1952 |

FOREIGN PATENTS

| | | |
|---|---|---|
| 40,294 | Austria | Dec. 27, 1909 |